United States Patent [19]

Lowe et al.

[11] 3,836,134
[45] Sept. 17, 1974

[54] PNEUMATIC ISOLATOR
[75] Inventors: Russell T. Lowe, Wellesley; Jerome S. Pepi, Chelmsford; Dale W. Schubert, Sudbury, all of Mass.
[73] Assignee: Barry Wright Corporation, Watertown, Mass.
[22] Filed: Mar. 19, 1973
[21] Appl. No.: 342,861

[52] U.S. Cl. .................................. 267/152, 267/35
[51] Int. Cl. ............................................. F16f 3/67
[58] Field of Search .......... 267/34, 35, 33, 121, 152

[56] References Cited
UNITED STATES PATENTS
3,001,783  9/1961  Moody .................................. 267/34
3,118,659  1/1964  Paulsen ................................ 267/35

Primary Examiner—James B. Marbert
Attorney, Agent, or Firm—Schiller & Pandiscio

[57] ABSTRACT

The invention is an isolator device for resilient supporting a first member relative to a second member under variable load conditions. The device comprises two integral spring stages, one of which is pneumatic, arranged so that the pneumatic spring stage normally carries the applied load and the other spring stage assumes substantially all of the applied load when the pneumatic spring is overloaded.

24 Claims, 5 Drawing Figures

PNEUMATIC ISOLATOR

This invention pertains to resilient mountings and supports for fixed or mobile equipment and more particularly to pneumatic compression springs designed for use as shock and vibration isolators.

Resilient supports for fixed and mobile machinery are known which comprise elastomeric members that are pressurized to form a pneumatic spring. Such devices are exemplified in U.S. Pat. Nos. 3,020,856, 3,648,983 and 3,160,407 and other references cited in said patents. It also is well known to provide resilient supports in which the elastomeric members are bonded to rigid members, as shown by U.S. Pat. Nos. 2,733,916, 2,854,232, 1,901,945, 3,537,696 and 2,699,934.

The present invention is concerned with pneumatic mountings that may be used in place of and offer certain advantages over pneumatic mounts of the type commonly referred to as "air bags" disclosed in said U.S. Pat. No. 3,648,983. Air bags utilize the principle of supporting a load on an air column and commonly are used where low natural frequencies, i.e. frequencies in the range of 0.5 to 3 Hz, are required. However, air bags have poor horizontal stability and also will collapse upon loss of air. While these problems can be overcome to some extent by providing horizontal restraints to limit horizontal movement and an elastomer snubber or bumper to limit the extent of collapse, the introduction of such additional components presents other problems obvious to persons skilled in the art and also increases manufacturing costs.

Accordingly, the primary object of this invention is to provide a pneumatic mount for fixed or mobile equipment that avoids or substantially minimizes the problems attendant to conventional air bag supports.

Another object of this invention is to provide a new pneumatic spring mount that is capable of functioning as both a vibration isolator and a shock isolator.

Still another object is to provide a pneumatic isolator having high horizontal stability and nominal low horizontal and vertical natural frequencies not exceeding about 3Hz. The isolators also can be made so that the horizontal and vertical natural frequencies will have a ratio of about 1:1.

Further objects of the invention are to provide spring mounts of the character described that have relatively wide load ranges and a minimum stroke capability in the order of one inch, are height adjustable by changing the degree of pressurization, can be manually pressurized, provide load support and both frequency and shock isolation in the event of loss of air, can be made automatically height adjustable by means of a displacement-sensitive air regulation system, are designed so that a relatively high percentage of the vertical stiffness is provided by the air column so as to minimize changes in resonant frequency with load, and have a substantially linear load deflection characteristic in the event of air loss.

The foregoing objects and other objects disclosed or rendered obvious by the following description are achieved by means of a pneumatic spring device that comprises a hollow block having an axis and first and second ends spaced along said axis with end walls sealing off said ends so that said end walls and said hollow block form a fluid tight chamber, and a compressible fluid filling said chamber, one of said end walls being rigid, and said block and the other end wall being made of an elastomeric material so that said block is axially deformable and said other end wall is capable of functioning as a resilient diaphragm that can stretch and bend and thereby compress said fluid when subjected to a load applied along said axis. The column of air in the chamber acts on the diaphragm to support most of the applied load and the resistance to deformation of the diaphragm is such that, in the event of overloading or loss of fluid pressure, the diaphragm can yield far enough for the applied load to be carried substantially or wholly by the elastomer block.

Other features and advantages of the invention are disclosed or rendered obvious by the following specification and the corresponding drawings wherein.

Figure 1:
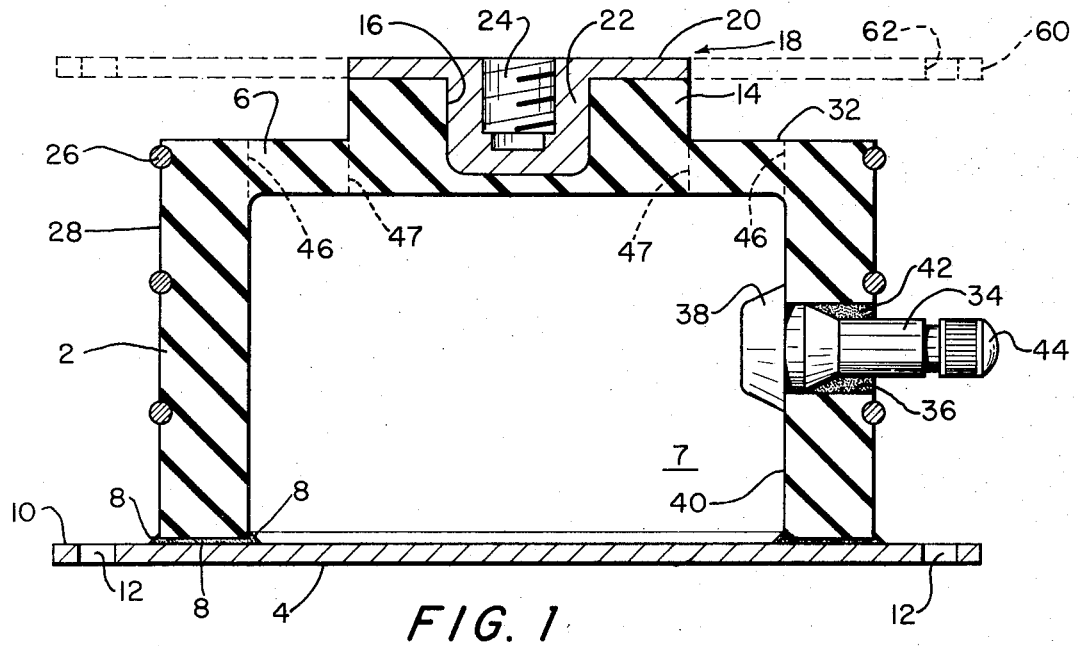
FIG. 1 is a vertical sectional view of a preferred embodiment of the invention.

Referring now to FIG. 1, the illustrated isolator unit comprises a hollow cylindrical block 2 that is made of an elastomeric material. The interior space of the block is closed off by two end walls 4 and 6 so as to form a sealed air chamber 7. The end wall 4 is in the form of a very stiff plate or other structural shape, preferably made of steel or some other metal or metal alloy, that is secured to the block, e.g. by chemical bonding with an adhesive as indicated at 8 (As it pertains to end wall 4, the term "very stiff" is intended to denote that the end wall is substantially rigid or inflexible under the operating pressures in chamber 7). The rigid plate extends beyond the outer periphery of the block so as to provide a flange 10 having holes 12 to accommodate screws or bolts for attaching that end of the isolator to a structural member (not shown). The other end wall 6 is integral with the block and is also made of an elastomer so as to be capable of functioning as a diaphragm. The end wall 5 may be formed independently of the block and subsequently joined to the block by chemical bonding. Preferably, however, end wall 6 and block 2 are molded as one unit.

End wall 6 is formed with a centrally located boss 14 on its outer surface, and the boss is provided with a centrally located cavity 16. Affixed to the boss is an end plate 18 comprising an annular portion 20 that overlies and engages the adjacent end surface of the boss and a plug portion 22 that extends into and fills cavity 16. The confronting and engaging surfaces of end plate 18 and boss 14 are fixed to one another by chemical bonding so that end wall 4 and plate 18 form a unitary structure. The end plate 18 is provided with a tapped blind hole 24 that is coaxial with plug portion 22 and serves as a screw-engaging means for coupling the upper end of the isolator to a second structural member (not shown).

The side wall of the elastomer block 2 is reinforced against radial expansion, i.e. expansion away from the block's longitudinal axis, by a plurality of spaced reinforcing rings 26 that are preferably made of steel but may be made of some other high tensile strength material, e.g. an aluminum alloy. The rings serve to prevent excessive bulging of block 2 under air pressure and also to improve horizontal stability, with a resulting improvement in the static load-deflection characteristic of the block as described below.

Rings 26 are preformed and preferably, as in the illustrated embodiment, the block is molded to the rings (i.e., the rings are mounted in the mold cavity in which the block is molded prior to introduction of the elastomer) so that the rings are partially embedded in and bonded to the outer surface 28 of the block. Alternatively, the block may be molded with the rings fully embedded therein. As a still further alternative, rings 26 may be slipped over the block after the latter has been molded and anchored in place by chemical bonding. In the latter case it is preferred that the rings be made slightly undersized so that they have to be forced onto the block. It is to be recognized also that although rings of circular cross-section are preferred, it is possible to use rings of other cross-sectional shapes, e.g. rings that are essentially flat continuous bands similar to the hoops supporting the staves of a wooden barrel. In any event, the rings are spaced so as to reinforce the block only at spaced regions so as not to prevent axial elastic deformation of the sleeve. The top-most ring is located in a plane extending through end wall 6, and preferably is closer to the outer surface 32 of that wall as shown, so as to provide added horizontal stiffness and stability for the upper end of the isolator. A ring is not required at the opposite end of the block since horizontal stability at that end is achieved by virtue of its attachment to the rigid end wall 4. The number of rings may be varied according to the axial length of the block 2.

The illustrated embodiment is completed by an air valve 34 which preferably takes the form of a conventional tire valve. The valve is mounted in a side hole 36 formed in block 2 and its inner end has a flange 38 that engages the inner surface 40 of the block so as to prevent it from being pulled out. The valve is chemically bonded to the block by means of a suitable adhesive 42 so as to provide a fluid-tight seal. As an alternative measure, the valve may be secured in place by molding the block to it with hot or cold bonding being effected between the valve and the block according to known techniques. The outer end of the valve is fitted with screw cap 44 which is removed when air is to be injected into or removed from chamber 7.

The isolator shown in FIG. 1 may be viewed as comprising two stages — a primary pneumatic spring stage and a secondary elastomer spring stage that also acts as a snubber. End wall 6 functions as a flexible and displaceable diaphragm that is supported by the column of air in chamber 7 and the diaphragm and the air column coact to function as a pneumatic spring to dynamically isolate a supported equipment, e.g. a machine, from a support structure, or vice versa. The secondary stage comprises block 2 which is elastically deformable and thus capable of providing vibration and/or shock isolation.

End wall 6 is capable of behaving as a diaphragm because its elastomeric nature allows it to stretch and bend to the extent necessary to undergo deflection toward or away from end wall 4. Although substantially the whole of end wall 6 may be considered to be a diaphragm since substantially the entire wall undergoes deflection and acts on the column of air, it also is possible to view it as comprising (1) a diaphragm portion which is the annular portion demarcated in FIG. 1 by lines 46 and 47, and (2) a relatively stiff piston portion which is the center circular portion demarcated by lines 47, with the piston portion being adapted for connection to one of the two members to be isolated and most of the elastic distortion that occurs on deflection of the wall being experienced substantially wholly by the annular diaphragm portion.

Figures 2, 3:
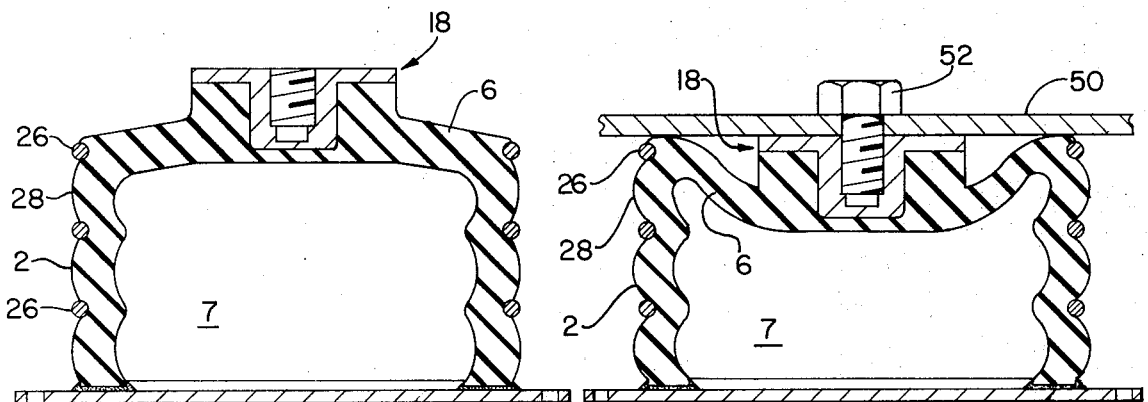
FIG. 2 is a view similar to FIG. 1 showing how the height of the isolator can be increased above its nominal loading level by increasing the fluid pressure.
FIG. 3 is a view similar to that of FIG. 2 showing how the diaphragm can deflect so that the applied load is carried by the walls of the elastomeric block.

The elastomeric nature of end wall 6 is evident by a comparison of FIG. 1 with FIGS. 2 and 3. In FIG. 1 the unit is shown as it appears without any load and with the air pressure in chamber 7 equal to the external air pressure. In this condition, end wall 6 is undeflected. FIG. 2 shows the shape assumed by the same device when it is pressurized without any external load so that its internal pressure substantially exceeds its external pressure. Here, wall 6 is stretched and deflected away from end wall 4. FIG. 3 shows how end wall 6 is deflected inwardly of block 2 when the unit is mechanically loaded and has substantially atmospheric pressure in chamber 7.

A typical application for the above-described isolator is for mounting equipment (such as a machine, motor, electronic instrument, etc.) to a support structure (such as a floor, baseplate, foundation, etc.) with the isolator being interposed between the equipment and the support structure. The flange 10 may be secured to the support structure by bolts, screws, rivets or the like mounted in holes 12, while end plate 18 is secured to the equipment by means of a screw that is mounted in an aperture in the equipment and screwed into tapped hole 24. Thus, as in FIG. 3, for example, the equipment supported by the isolator may comprise a base plate 50 secured to end plate 18 by a bolt 52. The chamber 7 of the isolator is pressurized so that the applied static load of the equipment is balanced off without any isolator deflection, i.e. so that end wall 6 is substantially planar and the height of end plate 18 measured from the flange 10 is the same as it is when the isolator is unloaded and its internal air pressure equals its external air pressure. This load-balanced condition is called the "nominal loading" condition.

When the device is nominally loaded, the air-supported wall 6 is undeflected (the condition of FIG. 1) and most of the compressive load is supported by the pneumatic spring while the remainder is carried by block 2. Assuming that the applied load is within the load range for which the isolator unit is designed and chamber 7 is pressurized to the extent required for nominal loading, the diaphragm 6 and the supporting column of air will dynamically isolate the equipment supported by the isolator and the support structure to which the isolator is mounted. More particularly, so long as the unit is pressurized and its loading is not excessive for its state of pressurization, the load will be carried mostly by end wall 6 and the supporting air column which coact to reduce the force transmitted from the equipment to the support structure if the equipment is the source of vibration and/or shock and also to reduce the dynamic motion transmitted to the equipment from the support structure if the latter is the source of vibration and/or shock.

If the applied load exceeds the rated load range or if the air pressure in chamber 7 drops substantially below that requirement for nominal loading, the diaphragm will be deflected downward into the block 2. This deflection involves not only elastic distortion of end wall 6 but also an increasing pull exerted by that wall on the upper end of block 2, with the result that the latter assumes an increasing proportion of the load. Should the deflection continue far enough for the supported equipment to contact the upper end of the block, as shown in FIG. 3 where plate 50 of the supported equipment is in engagement with the upper end of block 2, the applied load will be carried substantially fully by the block which will compress axially and expand radially to an extent determined by its stiffness and the applied load.

An object and advantage of this invention is provision of an isolator unit that is adapted to perform satisfactorily with different loads within a prescribed load range. This is achieved by using different air pressures with different size loads to effect nominal loading of the diaphragm and adjustment of air spring stiffness, and also by providing the block 2 with a spring stiffness sufficient to adequately support a load within the rated load range and the capability of compressing substantially linearly with increasing load as the applied load exceeds the upper limit of said range.

It is to be noted that the horizontal deflection stiffness of the unit is determined primarily by the horizontal stiffness of end wall 6 when the load is being carried by the air spring and primarily by the horizontal stiffness of block 2 when the load is being carried primarily by the block.

As is obvious, the horizontal and vertical stiffness components of the block 2 are established by its composition (durometer) configuration and dimensions (and also rings 26 as more fully described below). The horizontal and vertical stiffness components of the pneumatic spring are determined by the composition, configuration and relative dimensions of end wall 6 and the pressure exerted by the supporting column of air. Apart from choice of elastomer, primary control of air spring horizontal stiffness is achieved by appropriately selecting the thickness-to-length ratio of the annular diaphragm portions of end wall 6 (its length is the distance between dotted lines 46 and 47). This portion of end wall 6 must be thick enough so that it will not balloon or bulge out under air pressure to the extent that such ballooning or bulging adversely affects the load-deflection characteristic of the pneumatic spring stage.

An important advantage of the invention is that the isolator can be made with horizontal and vertical stiffness such that it has relatively low horizontal and vertical natural frequencies of vibration regardless of whether the load is being carried primarily by the end wall 6 and the column of air or primarily by the elastomer block. In a preferred embodiment, the isolator is designed so that within the operating stroke range of the diaphragm it has a vertical-to-horizontal natural frequency ratio of about 1:1 with both frequencies about 3 Hz, and when the operating stroke range of the diaphragm is exceeded, it has a vertical-to-horizontal natural frequency ration of about 2:1 with the vertical natural frequency not exceeding about 12 Hz. The operating stroke range is considered to be twice the height of the upper surface of end plate 18 above the peripheral portion of end wall 6 since in the usual installation the most that plate 18 can deflect downward from its nominal loading position is to the point where the supported equipment bottoms on the peripheral portion of end wall 6.

The invention is exemplified by an isolator made as shown in FIG. 1 and designed to provide a one-inch stroke and to carry loads in the range of 300 to 600 pounds. It comprised a cylindrical block with an outer diameter of about 5 inches, and a wall thickness of about 11/16 inch, while its surface 28 had a length of 2 15/16 inch. The annular diaphragm portion of end wall 6 has a thickness of about ⅜ inch and a length of about 9/16 inch. The boss 14 had an outside diameter of 2 ⅜ inch and the portion 20 of plate 18 had a thickness of ⅛ inch. The overall height measured from the upper surface of plate 18 to the upper surface 32 of block 2 was about 9/16 inch. The plate 4 was made of ⅛ inch steel. The end wall 6 and the block 2 were molded as one unit and were made of a 62 durometer neoprene. The tire valve 34 was a conventional tire valve. The rings 26 were steel rings with a circular cross-section having a diameter of ⅛ inch. Three rings were mounted as shown in FIG. 1 by molding the block to them. Tests made with this isolator revealed that it has a horizontal-to-vertical natural frequency ratio of substantially 1:1. It was found also that the nominal resonant horizontal and vertical freuqencies were 3.5 or less over the 300 to 600 pounds load range and, with or without air, the isolator had a natural vertical frequency of about 11 Hz and a horizontal natural frequency of about 6 Hz when the payload was resting on the block 2.

Figure 4:
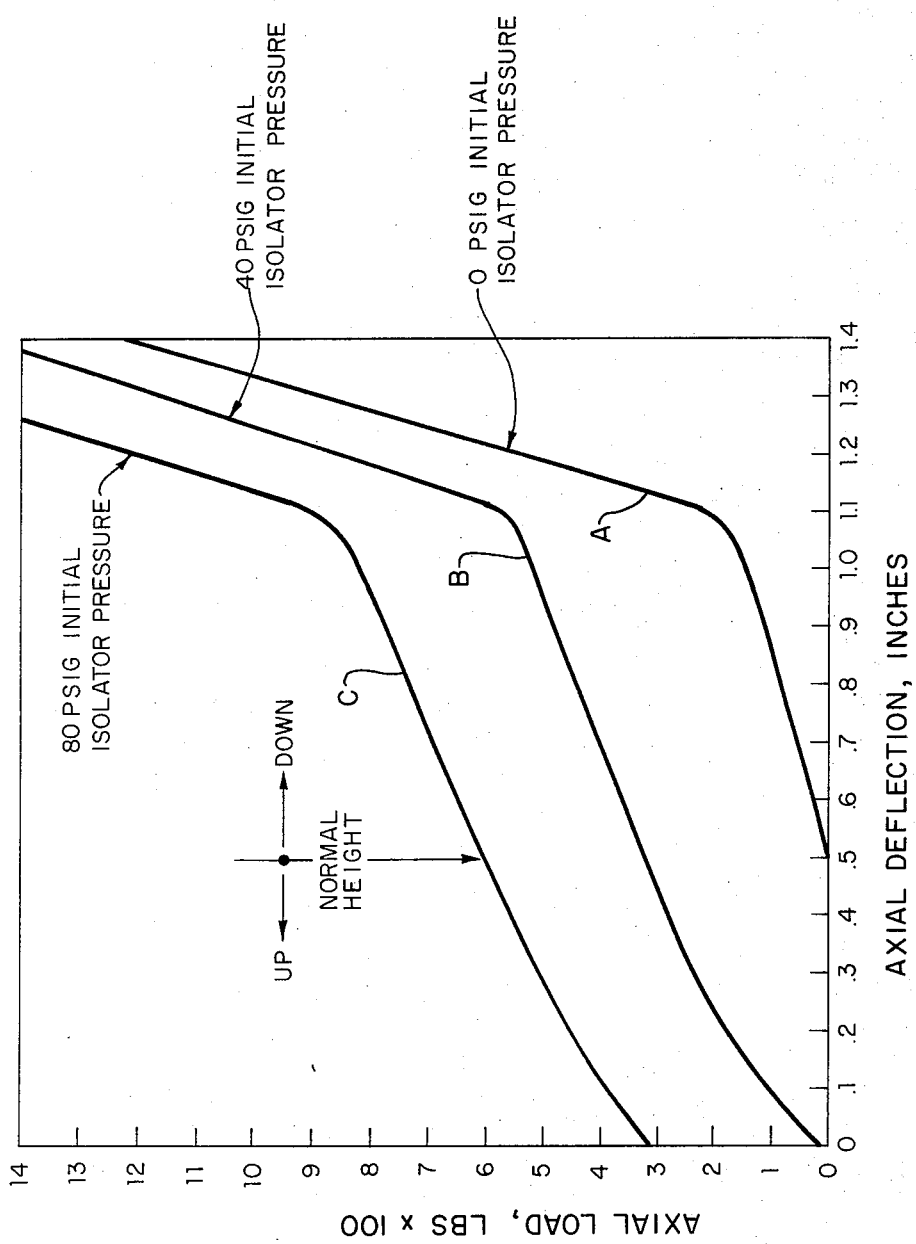
FIG. 4 shows static axial deflection curves for three different initial fluid pressure conditions.

FIG. 4 shows static-axial deflection curves of the foregoing unit for three different initial air pressure conditions. The undeflected position of end wall 6, i.e. the height of end plate 18 when the end wall is nominally loaded, is represented as 0.5 inches on the graph. Curve A represents the axial deflection of the unit when it had an initial pressure of 0.0 psig, while Curves B and C show axial deflection of the same unit when nominally loaded at pressures of 40 and 80 psig, respectively. The lower almost parallel portions of the three curves show deflection of the diaphragm, while the steeper portions of the three curves represent deflection of the block. In each case, the change in slope of the curve occurs when the deflection is about 1.1 inches (i.e., immediately after the load has contacted on block 2). It is significant to note that the air stiffness has a minimal effect; that is, changing the air pressure does not change the spring effect of the diaphragm very much from what it is when the air pressure is zero. Thus, with respect to FIG. 4, that portion of Curve A up to a deflection of about 1.1 inch was found to have a spring rate of about 300 pounds/inch, while the corresponding portion of Curves B and C had spring rates of 330 and 340 pounds/inch respectively. Between about 70–80 percent of the accrued stiffness under nominal loading conditions was provided by the air chamber, and the remainder of the stiffness was provided by the diaphragm 6. This is desirable since having the air provide as high a percentage of the vertical stiffness as is possible minimizes the change in resonant frequency with load.

Figure 5:
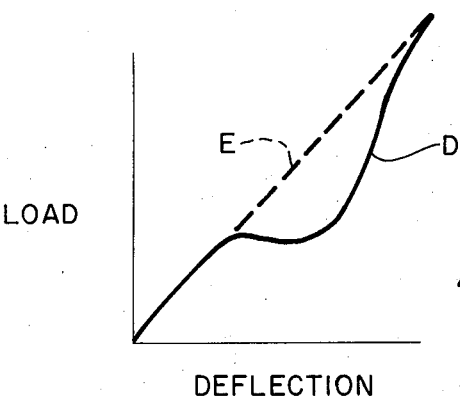
FIG. 5 shows how the static axial deflection curve of the elastomeric block is improved by use of reinforcing rings.

The use of rings 26 offers the advantage that it improves the load-deflection characteristic of the cylinder 2. This is demonstrated by FIG. 5. Without rings 26, the block 2 will exhibit a buckling action when its axial loading is increased, and this buckling action is reflected by curve D. With rings 26, the buckling action is prevented and the block will deflect linearly with increasing axial load as shown by Curve E.

Obviously, different types of elastomers may be used in practicing this invention. Thus, in addition to neoprene, it is possible to employ other natural or synthetic elastomers such as natural or synthetic rubbers and plastics having elastomer properties in fabricating the block 2 and end wall 6.

It is to be understood also that by suitably choosing the technical characteristics of the two spring stages (i.e. dimensions, durometer, etc.), the device may be given various characteristics in vertical compression and transverse shear. Moreover, the devices can be made in a variety of sizes, and with relatively wide load ranges, so that, for example, three or four different size units may satisfy a range of 300–19,200 pounds with minimum overlap.

As is believed obvious, the block 2 functions as a snubber to prevent total collapse of the pneumatic spring when the pneumatic spring is overloaded or the chamber 7 loses air pressure. Also, so long as the load has not contacted block 2, the unit acts primarily as a vibration isolator. When the load is supported wholly by block 2, the unit acts as both a vibration and shock isolator.

Persons skilled in the art will appreciate that plate 8 may take other forms. Thus it is contemplated that plate 18 may be extended laterally as shown in phantom by lines 60 and provided with holes 62 to accommodate bolts (not shown) for securing the plate to the equipment to be supported. In such case, the plate need not have plug portion 22 and tapped hole 24.

It also is contemplated that the bottom end of block 2 may be closed off by a flexible wall provided the latter is backed by a very stiff or substantially rigid plate like plate 4 with its flange 10 to be bonded to a very stiff or substantially rigid support.

Since still other modifications will be obvious to persons skilled in the art, the foregoing specification is to be considered exemplifying and the invention is to be limited only by the following claims.

What is claimed is:

1. A spring device for insertion between two elements for the purpose of providing an elastically yieldable connection between said elements, said device comprising:
    a hollow block having a longitudinal axis and first and second ends spaced along said axis;
    an end wall secured to said block at said first end and a substantially planar elastically deformable diaphragm attached to said block at said second end, said end wall and said diaphragm cooperating with said block to define a sealed chamber capable of being pressurized with a compressible fluid; and
    means communicating with said chamber for pressurizing said chamber with a compressible fluid;
    said block being elastically deformable so that it can shorten under a compressive load applied parallel to said axis;
    said diaphragm and fluid under pressure in said chamber coacting as a pneumatic spring capable of supporting a compressive load applied parallel to said axis, said pneumatic spring having a spring stiffness along said axis less than that of said block; and
    said diaphragm being displaceable under an increasing compressive load to a position within said chamber such that substantially all of said load is carried by said block.

2. A device according to claim 1 further including means for connecting said first end to one of said two elements and means for attaching said diaphragm to the other of said two elements.

3. A device according to claim 2 wherein said diaphragm has a boss at its center, and further wherein said means for attaching said diaphragm to the other of said two elements is affixed to said boss.

4. A device according to claim 3 wherein said attaching means includes a hollow internally threaded portion that is embedded in said boss in concentric relation to said axis.

5. A spring device according to claim 1 wherein said block is cylindrical and further including a plurality of spaced reinforcing rings surrounding and engaging the outer surface of said block for minimizing radial expansion of said block.

6. A device according to claim 1 wherein the vertical and horizontal stiffness components thereof have a ratio of approximately 1:1.

7. A device according to claim 1 wherein said means for pressurizing said chamber comprises normally closed valve means mounted in said block.

8. An isolator device for insertion between two elements for the purpose of reducing the amount of mechanical vibrations transmitted from one to the other of said elements, said device comprising:
    a hollow block defining an interior space and having a longitudinal axis;
    first and second means spaced along said axis and attached to said block at first and second opposite ends respectively thereof, said first and second means closing off said interior space so as to form a fluid-tight chamber;
    said first means comprising a diaphragm that extends at substantially a right angle to said axis and means for coupling said diaphragm to one of said elements; and
    means for connecting said second opposite end of said block to the other of said elements;
    said diaphragm being made of an elastically deformable material so that it can be bent and stretched and thereby move toward or away from said second end of said block to compress or expand a compressible fluid in said chamber in accordance with the pressure of said fluid and in response to changes in a compressive load applied parallel to said axis;
    said block also being made of an elastically deformable material, and said diaphragm being connected thereto so that substantially all of a compressive load applied parallel to said axis is carried by said diaphragm and the fluid in said chamber until said load exceeds a predetermined amount and when said load exceeds said predetermined amount substantially all of said load is carried by said block.

9. An isolator according to claim 8 wherein said diaphragm is made of the same material as said block and is integral with said block.

10. An isolator according to claim 8 wherein said first means comprises an end wall of elastically deformable material formed integral with said block, with said diaphragm being an annular portion of said wall and said means for coupling said diaphragm to said one element comprising a center portion of said wall.

11. An isolator according to claim 10 wherein said annular portion has a smaller wall thickness than said center portion.

12. An isolator according to claim 10 wherein said means for coupling said diaphragm to one of said elements comprises a mounting plate secured to said center portion of said end wall.

13. An isolator according to claim 12 wherein said center portion of said end wall comprises a boss and said mounting plate is attached to said boss.

14. An isolator according to claim 13 wherein said boss has a cavity and said mounting plate includes a projecting section extending into said cavity.

15. An isolator according to claim 14 wherein said projecting section has a threaded hole aligned with said axis for engagement of a threaded member for connecting said one element to said mounting plate.

16. An isolator according to claim 14 wherein said projecting section of said plate is bonded to said boss.

17. An isolator according to claim 8 further including a plurality of spaced reinforcing rings mounted to said block in coaxial relation to said axis for preventing said block from bulging out laterally away from said axis.

18. An isolator according to claim 8 further including normally closed valve means mounted in said block for injecting a compressible fluid into said chamber.

19. An isolator according to claim 8 wherein said second means comprises a relatively stiff end wall and said means for connecting said second opposite end of said block to the other of said elements comprises a flange that is integral with said end wall.

20. A spring device according to claim 1 wherein said diaphragm and said block are formed as a single part.

21. A springe device according to claim 1 wherein the configuration and size of said block in cross-section is substantially unvarying between said end wall and said diaphragm.

22. A spring device according to claim 1 including a plurality of spaced reinforcing rings surrounding and embedded in the outer surface of said block for preventing expansion of said block radially of said axis, at least one of said rings being disposed in a co-planar relation to said diaphragm.

23. A spring device for insertion between two elements for the purpose of providing an elastically yieldable connection between said elements, said device comprising:
    a primary pneumatic spring stage and a secondary elastomer spring stage;
    said secondary stage comprising a hollow block that has a longitudinal axis and is elastically deformable so that it can shorten under a compressive load applied parallel to said axis;
    said primary stage comprising a diaphragm attached to and closing off one end of said block and means closing off the other end of said block so as to form a closed chamber capable of being pressurized with a fluid, and a fluid under pressure in said chamber, said diaphragm extending at substantially a right angle to said axis and being elastically deformable so that it can deflect along said axis, said diaphragm and said fluid coacting to form a pneumatic spring for supporting a compressive load applied parallel to said axis;
    said hollow block having a greater spring stiffness along said axis than said pneumatic spring; and
    said diaphragm being displaceable under an increasing compressive load to a position within said chamber such that substantially all of the load is carried by said block.

24. A device according to claim 23 wherein said diaphragm comprises a relatively stiff center portion and a relatively flexible annular portion that surrounds said center portion and is attached to said block, and further wherein substantially all of the deformation of said diaphragm under an increasing compressive load is experienced by said annular portion.

* * * * *